(12) United States Patent
Xue

(10) Patent No.: US 9,053,386 B2
(45) Date of Patent: Jun. 9, 2015

(54) METHOD AND APPARATUS OF IDENTIFYING SIMILAR IMAGES

(75) Inventor: Hui Xue, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/509,059

(22) PCT Filed: Jan. 18, 2012

(86) PCT No.: PCT/US2012/021722
§ 371 (c)(1),
(2), (4) Date: May 10, 2012

(87) PCT Pub. No.: WO2012/102926
PCT Pub. Date: Aug. 2, 2012

(65) Prior Publication Data
US 2013/0301935 A1    Nov. 14, 2013

(30) Foreign Application Priority Data
Jan. 28, 2011    (CN) .......................... 2011 1 0031701

(51) Int. Cl.
*G06K 9/62* (2006.01)
*G06F 17/30* (2006.01)

(52) U.S. Cl.
CPC ........ *G06K 9/6202* (2013.01); *G06F 17/30259* (2013.01)

(58) Field of Classification Search
CPC ... G06K 9/6202; G06K 9/46; G06K 9/00442; G06K 9/4633; G06K 9/62; G06F 17/30253; G06F 17/30265; G06F 17/30244; G06F 17/30256; G06F 17/30864
See application file for complete search history.

(56) References Cited

U.S. PATENT DOCUMENTS

| 7,421,128 B2 | 9/2008 | Venkatesan et al. |
| 2006/0117182 A1* | 6/2006 | Wolff ............................ 713/176 |
| 2006/0204079 A1 | 9/2006 | Yamaguchi |
| 2006/0242418 A1* | 10/2006 | Willamowski et al. ....... 713/176 |
| 2006/0251339 A1* | 11/2006 | Gokturk et al. ............... 382/305 |
| 2007/0239756 A1 | 10/2007 | Li et al. |
| 2008/0059461 A1* | 3/2008 | Brock et al. ..................... 707/6 |
| 2008/0118112 A1 | 5/2008 | Gotoh et al. |
| 2008/0219560 A1 | 9/2008 | Morimoto et al. |
| 2008/0313140 A1 | 12/2008 | Pereira et al. |
| 2009/0028436 A1 | 1/2009 | Yoshino et al. |
| 2009/0041361 A1 | 2/2009 | Takebe et al. |

(Continued)

OTHER PUBLICATIONS

The Chinese Office Action mailed Mar. 22, 2013 for Chinese patent application No. 201110031701.8, a counterpart foreign application of U.S. Appl. No. 13/509,059, 28 pages.

(Continued)

*Primary Examiner* — Jingge Wu
(74) *Attorney, Agent, or Firm* — Lee & Hayes, PLLC

(57) ABSTRACT

A user may submit an image and request from a server one or more images that are similar to the submitted image. The server may generate an image signature based on the content of the submitted image. The server may conduct a Hash operation to the image signature to generate one or more Hash values. These Hash values may be used to identify one or more candidate images similar to the image in a Hash table. These candidate images may be sorted and outputted to the user based on similarity. The similarity between each of the candidate images and the image may be determined using at least one of Hamming distance or Euclidean distance.

14 Claims, 7 Drawing Sheets

(56) References Cited

U.S. PATENT DOCUMENTS

| | | |
|---|---|---|
| 2009/0245573 A1* | 10/2009 | Saptharishi et al. .......... 382/103 |
| 2009/0274374 A1 | 11/2009 | Hirohata et al. |
| 2009/0324026 A1* | 12/2009 | Kletter .......................... 382/124 |
| 2009/0324100 A1 | 12/2009 | Kletter et al. |
| 2010/0008589 A1* | 1/2010 | Bober et al. ................... 382/218 |
| 2010/0166339 A1 | 7/2010 | Gokturk et al. |
| 2010/0212015 A1* | 8/2010 | Jin et al. .......................... 726/26 |
| 2010/0268628 A1* | 10/2010 | Pitkow et al. .................... 705/34 |
| 2010/0329572 A1* | 12/2010 | Kamay et al. ................. 382/209 |
| 2011/0026853 A1* | 2/2011 | Gokturk et al. ............... 382/305 |
| 2011/0219012 A1* | 9/2011 | Yih et al. ...................... 707/749 |
| 2011/0235908 A1 | 9/2011 | Ke et al. |
| 2012/0051634 A1 | 3/2012 | Chong et al. |
| 2012/0093371 A1* | 4/2012 | Li et al. .......................... 382/106 |
| 2012/0127540 A1* | 5/2012 | Moore et al. ................... 358/474 |

OTHER PUBLICATIONS

The PCT Search Report mailed May 8, 2012 for PCT application No. PCT/US12/21722, 9 pages.

The Chinese Office Action mailed Nov. 13, 2013, for Chinese patent application No. 201110031701.8, a counterpart foreign application of U.S. Appl. No. 13/509,059, 9 pages.

Translation of pp. 3-9 of the Chinese Office Action mailed Nov. 13, 2013, for Chinese patent application No. 201110031701.8, a counterpart foreign application of U.S. Appl. No. 13/509,059, 9 pages.

* cited by examiner

METHOD AND APPARATUS OF IDENTIFYING SIMILAR IMAGES

CROSS REFERENCE TO RELATED PATENT APPLICATIONS

This application is a national stage application of an international patent application PCT/US12/21722, filed Jan. 18, 2012, which claims priority to Chinese Patent Application No. 201110031701.8, filed on Jan. 28, 2011, entitled "METHOD AND DEVICE OF SIMILAR IMAGE RECOGNITION," which applications are hereby incorporated by reference in their entirety.

TECHNICAL FIELD

This disclosure relates to the field of multimedia image recognition. More specifically, the disclosure relates to methods and devices of image recognition.

BACKGROUND

Similar image retrieval, as a type of multimedia recognition technologies, is booming. The similar image retrieval may comprise feature extraction, index construction, inquiries, and similarities sorting. However, conventional technologies of similar image retrieval may present some problems (e.g., poor compatibility and fault tolerance problems) because conventional image signatures do not contain content information of images. For example, two images that have identical content but saved in different formats (e.g., bmp, jpeg, png, or gif) may be considered as different images.

SUMMARY

This disclosure provides methods and devices for identifying similar images. In some embodiments, a user may submit an image and request from a server a set of images that are similar to the submitted image. Upon receiving the submitted image, the server may generate an image signature based on the content of that image. The server may also conduct a Hash operation to the image signature to generate one or more Hash values. The one or more values may be used to identify candidate images similar to the image. The server may then determine an image similarity between each of these candidate images and the image.

In some embodiments, to generate the image signature, the server may convert the image into a gray image and then divide the gray image into multiple sub-images. The server may then calculate edge histograms of each of the multiple sub-images. Based on the edge histograms, the server may generate the image signature. In some embodiments, to generate the one or more Hash values, the server may conduct a Hash operation to the image signature using Locality-sensitive hashing functions to generate one or more first Hash values. The server may then conduct a Hash operation to each of the one or more first Hash values to generate one or more second Hash values. The one or more second Hash values may be used to identify the candidate images. In some embodiments, to determine the image similarity, the server may determine a similarity between the image and each of the one or more candidate images using at least one of Hamming distance or Euclidean distance.

BRIEF DESCRIPTION OF THE DRAWINGS

The Detailed Description is described with reference to the accompanying figures. The use of the same reference numbers in different figures indicates similar or identical items.

DETAILED DESCRIPTION

The detailed description of a method of and server for TCP is set forth with reference to the accompanying figures.

Figure 1:
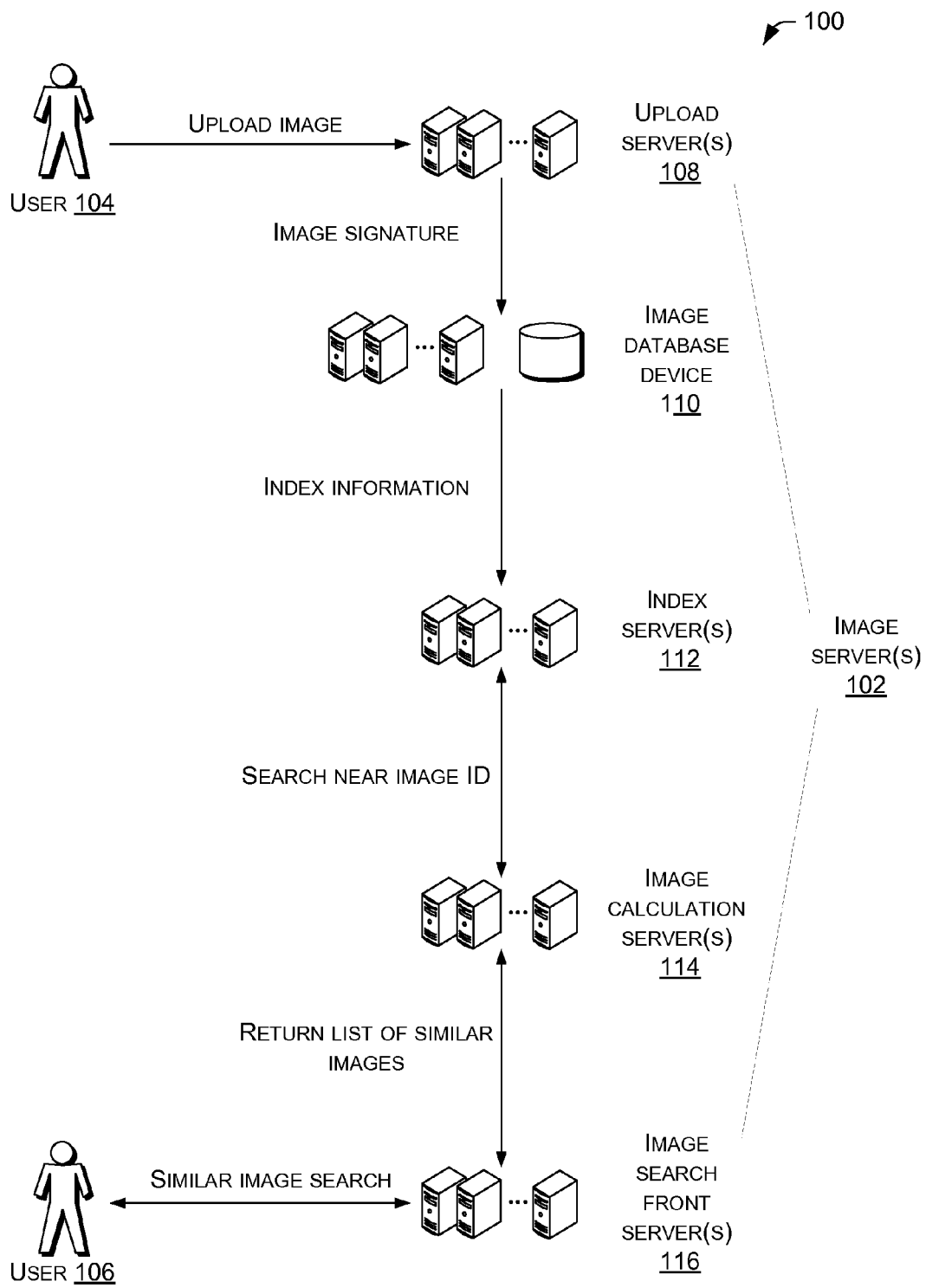
FIG. 1 is a schematic diagram showing an exemplary environment for identifying similar images.

FIG. 1 is a schematic diagram showing an exemplary environment 100 for identifying similar images. The environment 100 may include image servers 102 interacting with a user 104 and a user 106. The image servers 102 may include upload servers 108, an image database device 110, index servers 112, image calculation servers 114, and image search front servers 116.

The user 104 may uploads an image to the upload servers 108 to create image index database. The upload servers 108 may calculate an image signature of the image and send the image signature to the image database device 110. In some embodiments, the image may be obtained from the Internet and saved in the upload servers 108 using a crawler system. In some embodiments, the upload servers 108 may calculate the image signature of the image based on content information of the image, thus reducing probability of a conflict. For example, the content information of the image may include metadata (e.g., color, grain, etc.) instead of a non-byte stream.

The image database device 110 may conduct a Hash operation to the image by using Locality-sensitive hashing (LSH) after receiving the image signature. The resulting values are then sent as index information to the index servers 112.

The user 106 may send an image to the search front servers 116 and request the image servers to return a set of images similar to the submitted image. The image search front servers 116 may transmit the image to the image calculation servers 114 and request the similar images or a list of the similar images. In some embodiments, an image signature may be generated based on the content information of the image, and then the index servers 112 search for similar images based on the image signature. In some embodiments, the image calculation servers 114 may search the similar images (e.g., IDs) based on Hash values of these similar images on the index servers 112. For example, the image calculation servers 114 may identify IDs associated with images having the same Hash value as the image. The similar image or a list of similar images may be returned to the image search front server 116 and displayed to the user 106.

Figure 2:
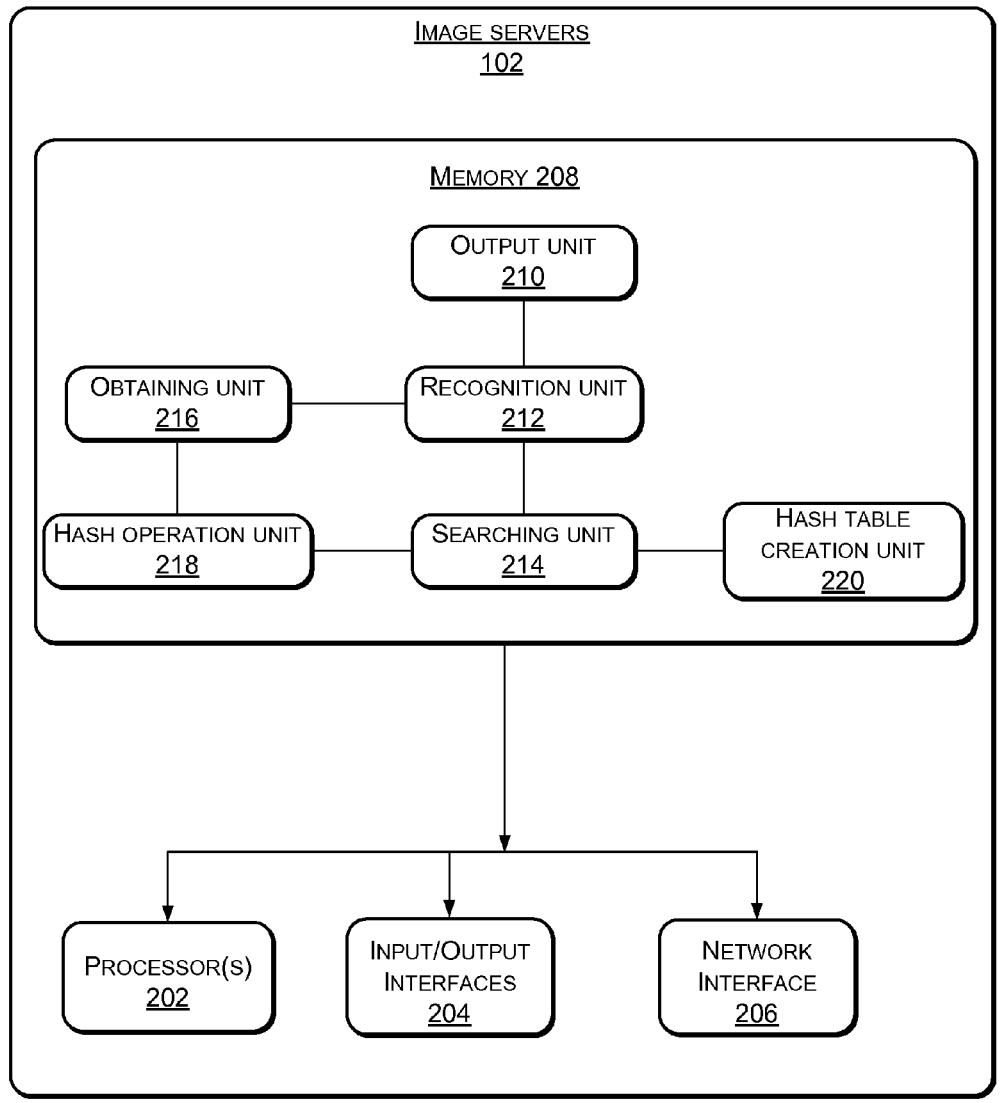
FIG. 2 is a schematic block diagram showing an exemplary of the image server(s) of FIG. 1.

FIG. 2 is a schematic block diagram showing details of exemplary image servers 102 of FIG. 1. The image servers 102 may be configured as any suitable servers. In one exemplary configuration, the image servers 102 include processors 202, input/output interfaces 204, network interfaces 206, and memory 208.

The memory 208 may include computer-readable media in the form of volatile memory, such as random-access memory (RAM) and/or non-volatile memory, such as read only memory (ROM) or flash RAM. The memory 208 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 208 in more detail, the memory 208 may store any number of software modules or units, including an output unit 210, a recognition unit 212, a search unit 214, an obtaining unit 216, a Hash operation unit 218, and a Hash table creation unit 220. The obtaining unit 216 may obtain an image signature of an image submitted by the user 106. The Hash operation unit 218 may conduct a Hash operation to the image signature. The searching unit 214 may search for candidate images in predetermined Hash tables. The recognition unit 212 may identify and retrieve image(s) similar to the image from candidate images.

In some embodiments, the image servers 102 may determine similarities of images based on image signatures generated from content of the images. For example, the more similar the images are, the more similar their image signatures are. In some embodiments, the similarities may be related to Hamming distance or Euclidean distance. For example, the shorter these distances, the more similar are the images. Accordingly, images that are the same but saved in different formats may have the same image signatures. Also, problems of fault tolerance with the conventional technologies may be resolved.

In some embodiments, the output unit 210 may output the candidate images based on the similarities. In some embodiments, the Hash table creation unit 220 may create L Hash tables by conducting Hash operations to the image signature to obtain L Hash values by using L LSH functions, wherein L is an integer. The Hash table creation unit 220 may also conduct a Hash operation to the L first Hash values to obtain L second Hash values by using an overall Hash function. The Hash table creation unit 220 may record a $j^{th}$ second Hash value, an image identification and an image signature in the $j^{th}$ Hash table, wherein j=1 . . . L.

Figure 3:
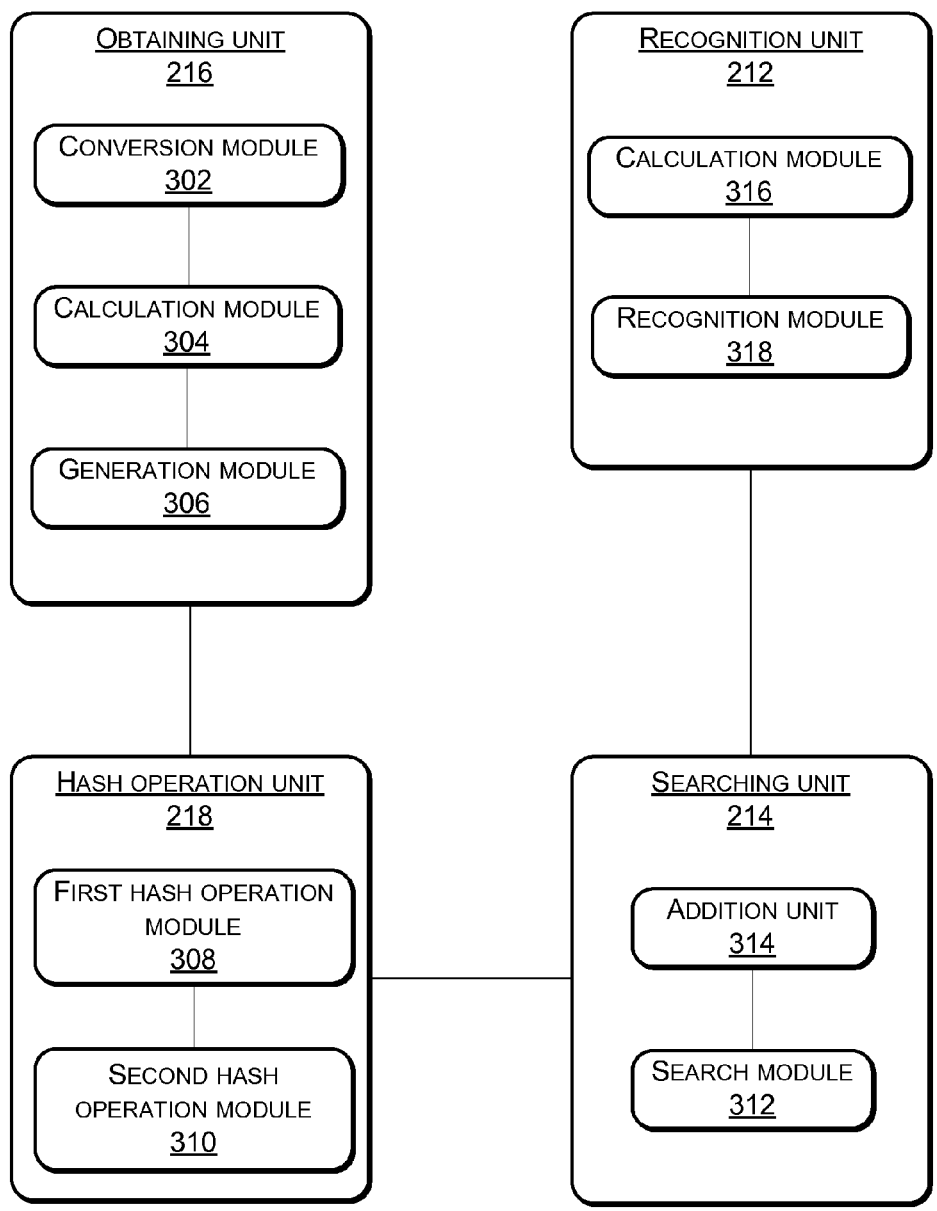
FIG. 3 is a schematic block diagram showing another exemplary of image server(s) of FIG. 1.

FIG. 3 is a schematic block diagram showing another exemplary of image servers 300 that may include, similar to the image servers 102 of FIGS. 1 and 2, the recognition unit 212, the searching unit 214, the obtaining unit 216, and the Hash operation unit 218.

The obtaining unit 216 may include a conversion module 302, a calculation module 304, and a generation module 306. The conversion module 302 may convert an image submitted by the user 106 to a gray image. The calculation module 304 may then divide the gray image into N×N sub-images, calculate edge histograms from M directions for each of the sub-images, and obtain N×N×M calculation results, wherein N and M are integers. The generation module 306 may assemble the N×N×M calculation results as an N×N×M dimensional vector of the image signature. In some embodiments, non-uniform quantitative technologies based on human eye sensitivity can be applied to the N×N×M dimensional vector. In some embodiments, statistic data of edge histograms may be used as basic features of the image signature. The statistic data combined with the image division and the non-uniform quantitative technologies based on human eye sensitivity may be resolved problems caused by different colors, scales, or partial fuzzy & distortion. In some embodiments, the gray images may be divided into N×P sub-images.

In some embodiments, the calculation module 304 may, for each image block included in a sub-image, calculate a gradient value on each of the M directions. The calculation module 304 may then select one of the M directions that has the greatest gradient value as the direction of the corresponding image block for statistics. The module 304 may further calculate the number of the selected directions for each of the M directions and obtain the statistic value as histograms of the sub-image.

Suppose that a sub-image has 1000 image blocks, and M has 5 directions including A, B, C, D and E (i.e., M=5). Further, suppose that direction A for statistic data are 100 image blocks, direction B has 200 image blocks, direction C has 300 image blocks, direction D has 400 image blocks, and direction E has no image blocks. As a result, the statistics value (i.e., histograms) of the sub-image may be represented by a vector (100, 200, 300, 400, 0).

In some embodiments, the Hash operation unit 218 may include a first Hash operation module 308 and a second Hash operation module 310. The first Hash operation module 308 may conduct Hash operations to the image signature, and obtain L first Hash values by using L LSH functions, wherein L is an integer. The second Hash operation module 310 may conduct Hash operations to the L first Hash values, and obtain L second Hash values by using an overall Hash function. In some embodiments, a method of mass similar image index based on the LSH technology may be used to reduce complexity of search time to a non-linear level.

In some embodiments, the searching unit 214 may include a searching module 312 and an addition module 314. The searching module 312 may search an entry recording the second Hash value in the Hash tables. Each entry of the Hash tables records a Hash value and an image identification of an image. Each entry may further include an image signature. The addition module 314 may add an image to the candidate images upon identifying an entry having the second Hash value in the Hash tables. In some embodiments, an $i^{th}$ second Hash value may correspond to an $i^{th}$ Hash table, and i=1 . . . L.

In some embodiments, the first Hash operation module 308 may convert an image signature to a R dimensional binary vector, wherein R is an integer. The first Hash operation module 308 may then generate L LSH functions by using the R dimensional binary vector. For example, each of the LSH functions is generated based on a one-dimensional or multiple-dimensional binary vector of the R dimensional binary vector.

In some embodiments, the first Hash operation module 308 may assign an input parameter of a LSH function as K, randomly select K dimensional binary vector from the R dimensional binary vector, and combine the K dimensional binary vector as a return value of the LSH function, wherein K<R.

In some embodiments, the recognition unit 212 may include a calculation module 316 and a recognition module 318. The calculation module 316 may calculate a spatial distance between an image signature of a submitted image and an image signature of a candidate image (e.g., Hamming distance or Euclidean distance). The recognition module 318 may then determine a similarity between the candidate image and the submitted image based on the spatial distance. For example, the smaller the spatial distance is, the more similar the candidate image is to the submitted image.

FIGS. 4-7 are flowcharts showing exemplary processes of identifying similar images. The processes are illustrated as a collection of blocks in logical flowcharts, which represent a sequence of operations that can be implemented in hardware, software, or a combination. For discussion purposes, the processes are described with reference to the image servers 102 shown in FIGS. 1-3. However, the processes may be performed using different environments and devices. Moreover, the environments and devices described herein may be used to perform different processes.

Figure 4:
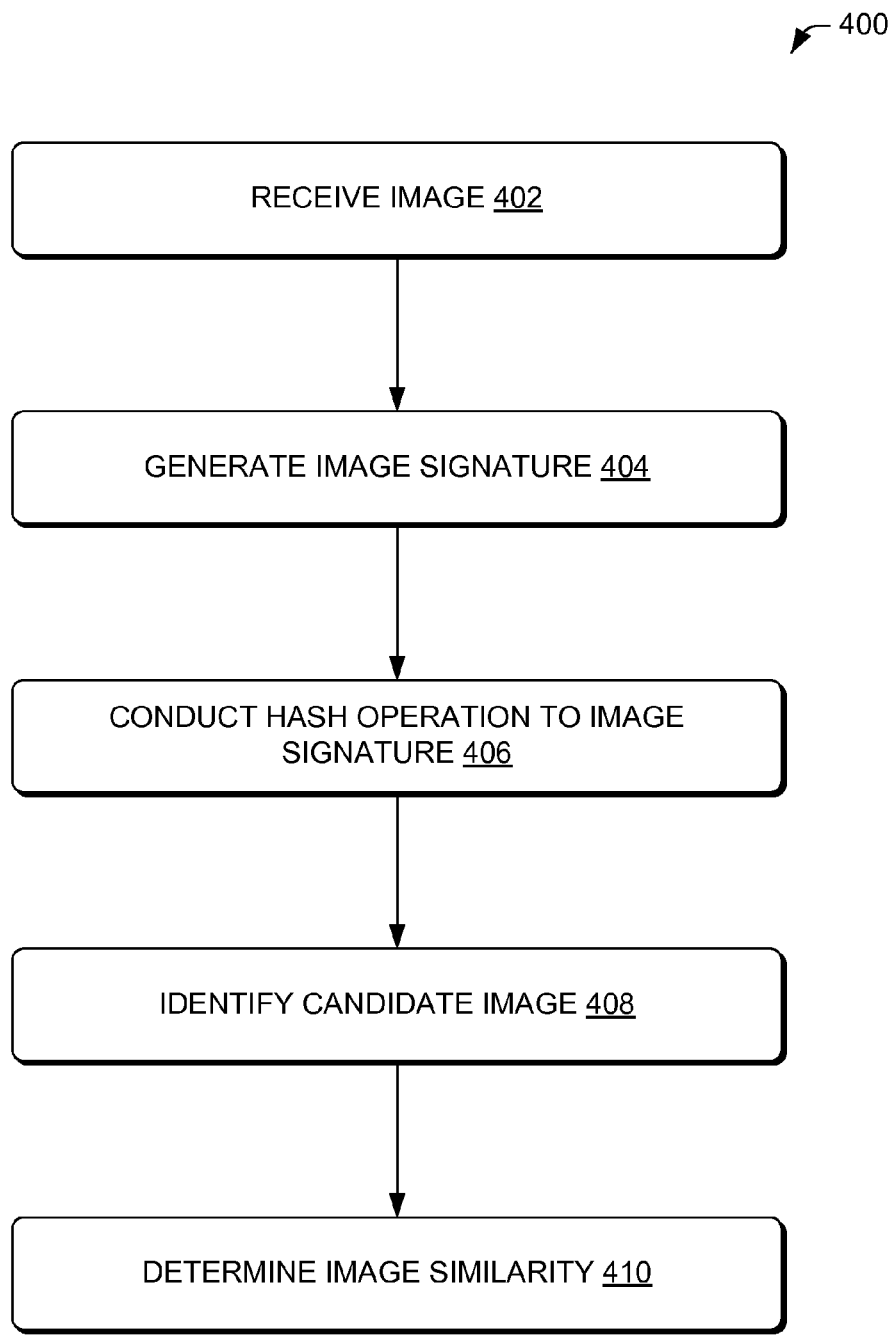
FIG. 4 is a flowchart showing an exemplary process of identifying similar images.

FIG. 4 is a flowchart showing an exemplary process 400 of identifying similar images. The process 400 may be performed by one or more processors of the image servers, which may be inclusive of one or more microcontrollers (MCU) or one or more field-programmable gate arrays (FPGAs).

At 402, the image servers may receive an image submitted by the user 106 via, for example, a USB transmission interface, a Bluetooth transmission interface, or an Ethernet transmission interface. At 404, the obtaining unit 216 may generate or otherwise obtain an image signature of the submitted image. For example, the obtaining unit 216 may involve a MCU or a FPGA to calculate the image signature.

At 406, the Hash operation unit 218 may conduct a Hash operation to the image signature. In some embodiments, the Hash operation unit 218 may include a MCU or a FPGA configured to perform the Hash operations. In some embodiments, the functions performed by the Hash operation unit 218 and the obtaining unit 216 may be implemented by the same processor(s).

At 408, the search unit 214 may search entries corresponding to a result of the Hash operation in predetermined Hash tables to identify candidate images. At 410, the recognition unit 212 may recognize an image similar to the submitted image from candidate images corresponding to the entries. In some embodiments, the image calculation server 108 obtains, locally or from third-party equipment, the candidate images based on the IDs of similar images returned by the index server 106, and recognizes the image similar to the submitted image from the candidate images based on the entries. In some embodiments, the recognition unit 212 may obtain, locally or from third-party equipment, the candidate image based on the ID of the similar images returned by the searching unit 214, and recognizes the image similar to the submitted image from the candidate images based on the entries.

In some embodiment, the output unit 210 may include a Bluetooth transmission module, an infrared transmission module and/or an Ethernet transmission module to output the identified similar image and to display to the user 106.

Figure 5:
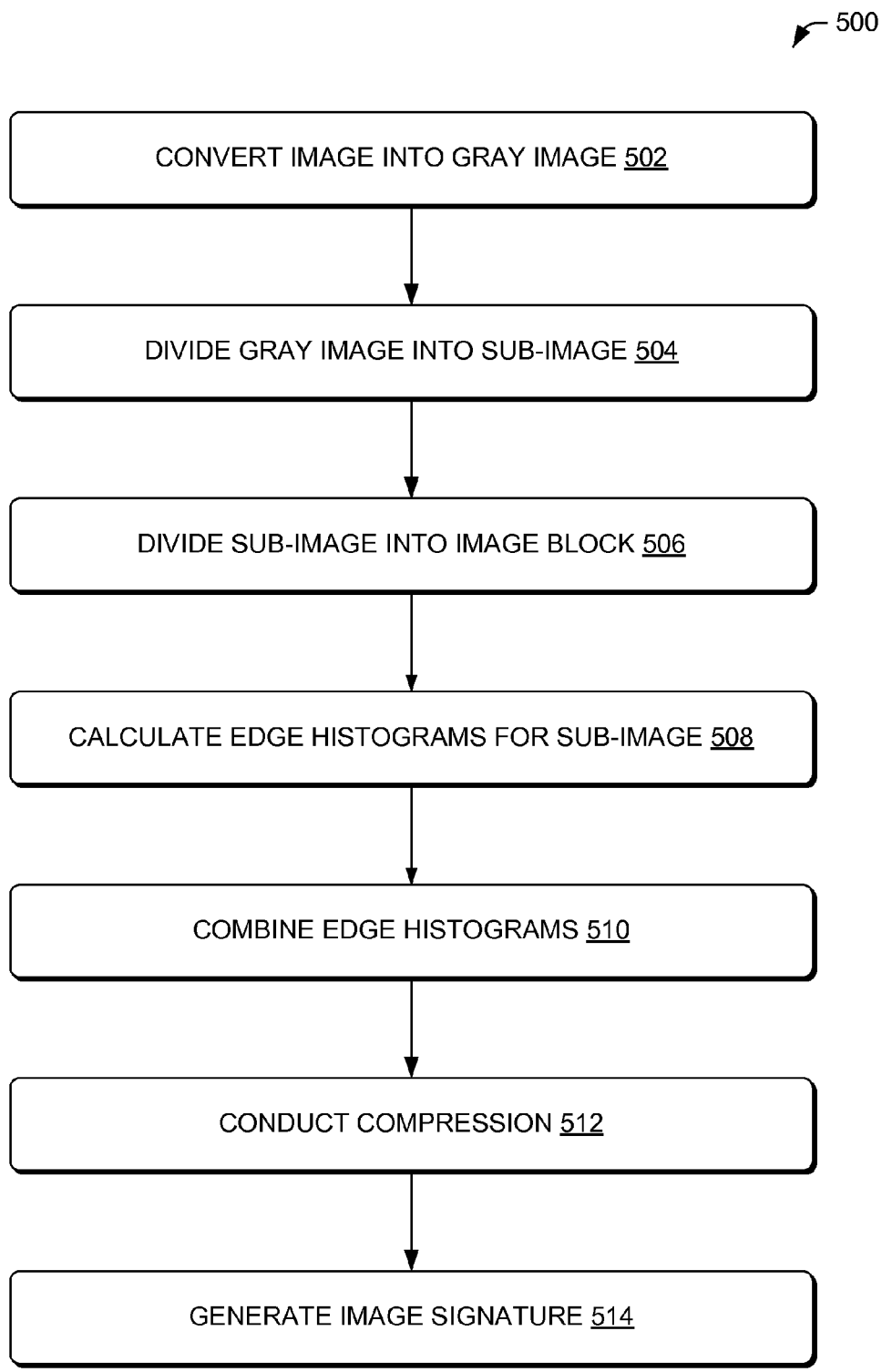
FIG. 5 is a flowchart showing an exemplary process of obtaining an image signature.

FIG. 5 is a flowchart showing an exemplary process 500 of obtaining an image signature. The process 500 may generate an image signature based on the grain features of edge histograms.

At 502, the image servers convert an image submitted by the user 106 to a gray image to make final results not sensitive to color and/or light. At 504, the calculation module 304 may divide the gray image into N×N sub-images. At 506, the calculation module 304 may further divide each of the sub-images into a fix number of image blocks. The area of each image block depends on the area of the submitted image. At 508, the calculation module 304 may then calculate edge histograms from one or more directions for each of the sub-images. For example, the calculation module 304 may calculate a gradient value of an image block on five (5) directions to select a direction having the greatest gradient value to be the direction of the image block for statistics. The calculation module 304 may calculate the frequency that each of the 5 directions is selected as the direction for statistics in one sub-image. The frequency may be used as histograms of the sub-image.

Suppose that a sub-image is divided into 1000 image blocks, and the one or more directions include A, B, C, D and E, 5 directions. Further, suppose that direction A is selected as the directions of 100 image blocks for statistics, direction B had 200 image blocks, direction C has 300 image blocks, direction D has 400 image blocks, and direction E has 0 image blocks. As a result, the statistics value (i.e., corresponding histograms) of the sub-image is a vector (100, 200, 300, 400, 0).

At 510, the generation module 306 may combine the vector of each sub-image to a multiple dimensional vector as the image signature of the image submitted by the user 106. If N=4, an image signature may be presented as a 4×4×5=80 dimensional vector. In some embodiments, at 512, a non-uniform quantitative method may be adopted given non-uniform characteristics of human eye sensitivity. The generation module 306 may conduct quantitative compression to, for example, the 80 dimensional vector to achieve better space utilization. For example, an image signature would be approximately 240 bits (i.e., 30 bytes) if 8 digitals between 0-7 for quantitative process are used. The process may save 90% of storage.

At 514, the image servers 102 may obtain the image signature after the compression process. In some embodiments, the conversion module 302, the calculation module 304 and the generation module 306 may be implemented in a MCU.

Figure 6:
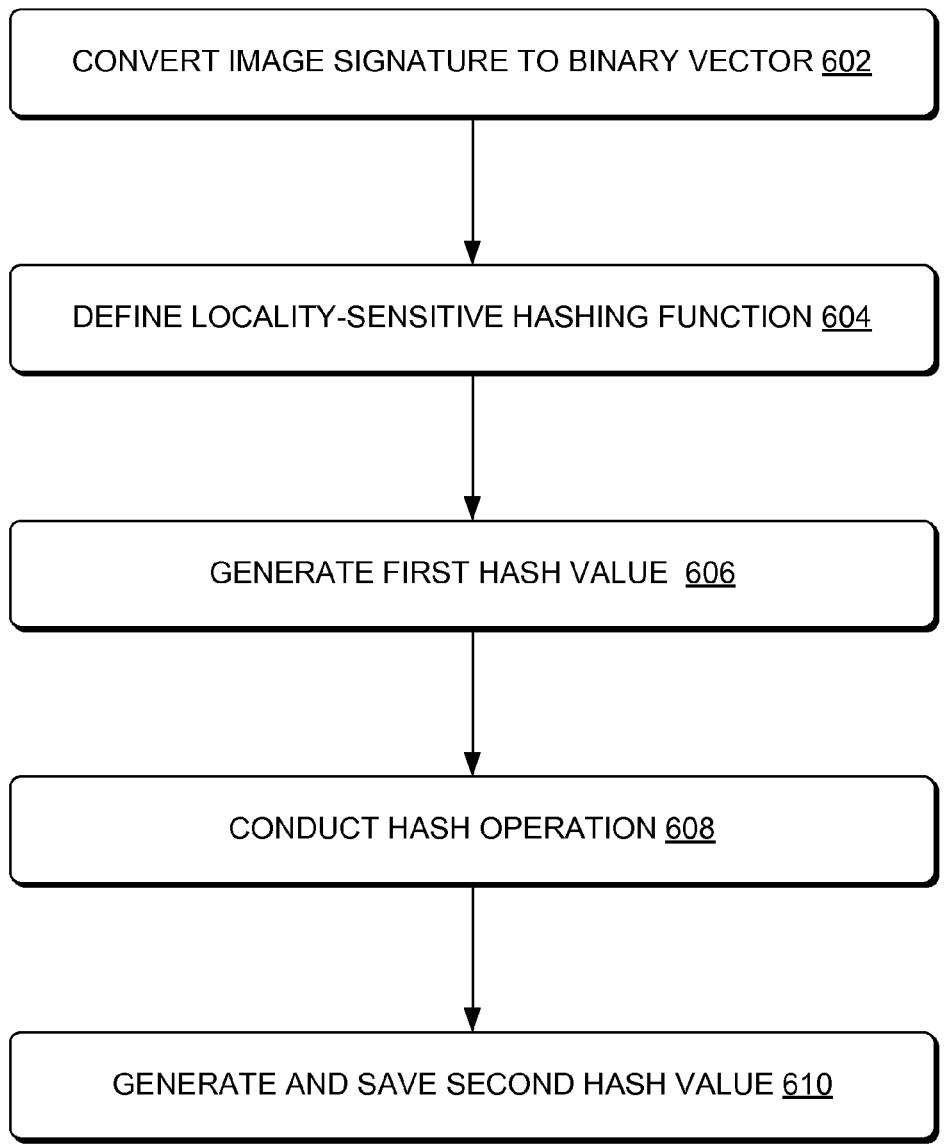
FIG. 6 is a flowchart showing an exemplary process of creating an image index.

FIG. 6 is a flowchart showing an exemplary process 600 of creating an image index. At 602, the first Hash operation module 308 may convert a vector obtained in the process 500 to a high-dimensional binary vector (i.e., each dimension is 1 or 0) in a Hamming space. For example, suppose that a one-dimensional vector value is X and the biggest value is C. As a result, the vector presented in a Hamming space is C-dimensional binary vector including X consecutive 1s right after C-X consecutive 0s.

At 604, the first Hash operation module 308 may define a Hash function G by randomly selecting a K dimensional binary vector from vectors obtained in the operation 602, and return a value after combining the results. In these instances, the greater the similarity between the vectors is, the greater the probability of generating the same Hash value is.

At 606, the first Hash operation module 308 may conduct L Hash functions on the high dimensional vector obtained in the operation 602 to reduce errors of the similarity search, wherein L is an integer. At 608, the second Hash operation module 310 may conduct Hash operations to the results from the operation 606 with the traditional Hash function (e.g., Message-Digest Algorithm 5 (MD5)). At 610, the second Hash operation module 310 may save Hash results of the operation 608 as keys and unique IDs of image in corresponding L Hash tables, wherein L is an integer. In some embodiments, images with the same image signatures may be saved in the same bin, while images with different image signatures are more likely to be saved in different bins. In some embodiments, the first Hash operation module 308 and the second Hash operation module 310 may be implemented by a same encoding chip or a same MCU.

In some embodiments, because accuracy and recall rates may be dramatically affected by different K and L, a simulation may be conducted for prediction in advance. The image index, supported by appropriate hardware, may be stored in the memory to increase efficiency in searching. In some embodiments, an image index document may be stored in local disks or processed in a way of distribution for a mass sample database.

Figure 7:
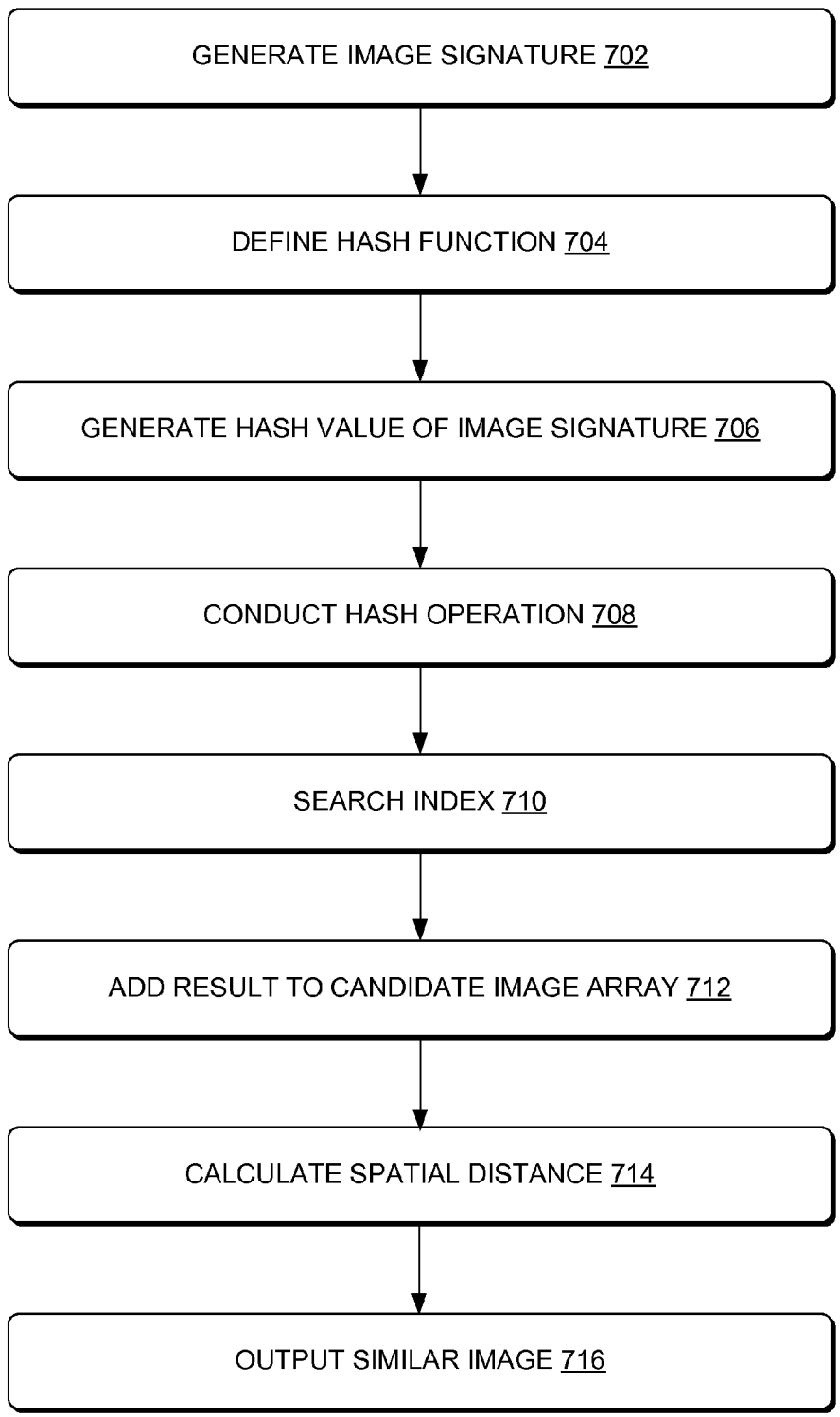
FIG. 7 is a flowchart showing another exemplary process of identifying similar images.

FIG. 7 is a flowchart showing an exemplary process 700 of identifying similar images. At 702, the obtaining unit 210 may calculate an image signature of the image submitted by the user 106. At 704, the Hash operation unit 218 may define a LSH function based on the image signature. At 706, a Hash code of the image signature may be calculated using multiple LSH functions that are randomly selected. At 708, a Hash operation (e.g., MD5) may be conducted to obtained results. At 710, the searching unit 214 may search L Hash tables using the results obtained in the operation 708 as keys.

At 712, the searching unit 214 may add candidate images based on the searched results to a candidate image array. At 714, the recognition unit 212 may calculate a spatial distance (e.g., Hamming distance or Euclidean distance) between each image signature in the candidate image array and the image signature of the image submitted by the user 106. In some embodiments, the distance may indicate similarity between the candidate image and the submitted image.

At 716, the output unit 210 may sort and output candidate images based on the distance. In these instances, a number of the image signatures in the candidate array is much smaller than a number of the image signatures in database. Accordingly, the cost of calculation can be greatly reduced while compared with conventional technologies.

In some embodiments, the Hash operation unit 218 may be a MCU or a FPGA. In some embodiments, the functions operated by the Hash operation unit 218 and the obtaining unit 216 can be implemented by a same processor. In some embodiments, the searching unit 214 may communicate with database through an internal bus, and the searching unit 214 and the recognition unit 212 may be implemented by a same MCU.

In this disclosure, an image signature may be determined based on content of the image. Similarity of image signatures depends on similarity of image content. For example, the more similar two images are, the more similar their image signatures are. The similarity may be represented by a spatial distance (e.g., Hamming distance or Euclidean distance). Therefore, two identical images but saved in different formats may have the same image signatures, resolving the fault tolerance problem existing in the conventional similar image recognition technologies. The disclosure also introduces methods of creating a mass similar image index based on a LSH Hash technology. The methods may reduce complexity of search, save time to a non-linear level, and sort and output results based on similarities. The disclosure also provides edge histogram statistics as a basic feature of the image signature, an image division and the non-uniform quantitative technology based on human eye sensitivity.

The embodiments in this disclosure are merely for illustrating purposes and are not intended to limit the scope of this disclosure. A person having ordinary skill in the art would be able to make changes and alterations to embodiments provided in this disclosure. Any changes and alterations that persons with ordinary skill in the art would appreciate fall within the scope of this disclosure.

What is claimed is:

1. A computer-implemented method for identifying similar images, the method comprising:
    receiving an image;
    generating an image signature of the image based on content of the image;
    conducting one or more first Hash operation(s) to the image signature using one or more Locality-sensitive hashing (LSH) functions to generate a result of one or more first Hash values;
    conducting a second Hash operation to the result of the first Hash operations, thereby conducting the second Hash operation to each of the one or more first Hash values, to generate one or more second Hash values;
    identifying, in one or more Hash tables, one or more candidate images based on the one or more first Hash values or one or more second Hash values; and
    determining an image similarity between the image and each of the one or more candidate images.

2. The computer-implemented method as recited in claim 1, wherein the generating of the image signature comprises:
    converting the image into a gray image;
    dividing the gray image into one or more sub-images;
    calculating edge histograms from multiple directions for each of the one or more sub-images; and
    generating the image signature based on the edge histograms.

3. The computer-implemented method as recited in claim 1, wherein the identifying of the one or more candidate images comprises identifying based on the one or more second Hash values.

4. The computer-implemented method as recited in claim 3, wherein the one or more Hash tables included one or more entries, each entry including at least one of a Hash value, an image identification of one image, or an image signature of one image, and each of the one or more second Hash values corresponds to one of the one or more Hash tables.

5. The computer-implemented method as recited in claim 1, wherein the conducting of the one or more first Hash operations comprises:
    converting the image signature to a binary vector having a plurality of dimensions;
    generating one or more LSH functions based on the binary vector such that each of the one or more LSH functions is generated based on at least one of a single dimension binary vector of the binary, or a multiple dimension binary vector of the binary vector; and
    conducting the one or more first Hash operations to the binary vector by using the one or more LSH functions.

6. The method as recited in claim 5, wherein the generating of the one or more LSH functions comprises:
    assigning a certain number to each input parameter of the one or more LSH function, the certain number being lower than a number of the plurality of dimensions; and
    selecting a binary vector having the certain number of dimensions from the binary vector to generate a return value for each of the one or more LSH functions.

7. The method as recited in claim 1, further comprising:
    conducting the one or more first Hash operations to an image signature of each of the one or more candidate images to generate one or more third Hash values based on the one or more LSH functions;
    conducting the second Hash operation to each of the one or more third Hash values to generate one or more fourth Hash values; and
    recording each of the one or more fourth Hash values, a corresponding image identification, and a corresponding image signature in a corresponding Hash table.

8. One or more servers comprising:
    memory;
    one or more processors coupled to the memory;
    an obtaining unit configured to:
        receive an image, and generate an image signature of the image based on content of the image;

a Hash operation unit configured to conduct a Hash operation by executing operations to:

conduct one or more first Hash operation(s) to the image signature using one or more LSH functions to generate a result of one or more first Hash values, and conduct a second Hash operation to the result of the first Hash operations, thereby conducting the second Hash operation to each of the one or more first Hash values to generate one or more second Hash values;

a searching unit configured to identify, in one or more Hash tables, one or more candidate images based on the one or more Hash values; and a recognition unit configured to determine an image similarity between the image and each of the one or more candidate images.

9. The one or more servers as recited in claim 8, wherein the obtaining unit is configured to generate the image signature by executing operation to:

convert the image into a gray image;

divide the gray image one or more sub-images, and calculate edge histograms from multiple directions for each of the one or more sub-images; and generate the image signature based on the edge histograms.

10. The one or more servers as recited in claim 8, wherein the searching unit is configured to identify the one or more candidate images by identifying, based on the one or more second Hash values, the one or more Hash tables including one or more records that each include at least one of a Hash value, an image identification of one image, or an image signature of one image.

11. The one or more servers as recited in claim 8, wherein the Hash operation unit is configured to conduct the one or more first Hash operations by executing operations to:

convert the image signature to a R dimension binary vector, the R being a fixed integer;

generate one or more LSH functions based on the R dimension binary vector, each of the one or more LSH functions being generated based on at least one of a single dimension binary vector of the R dimension binary vector, or a multiple dimension binary vector of the R dimension binary vector; and conduct the one or more first Hash operations by using the one or more LSH functions.

12. The one or more servers as recited in claim 11, wherein the Hash operation unit is further configured to generate the one or more LSH functions by:

assigning K to each input parameter of the one or more LSH function, the K being another fixed integer and lower than R; and selecting K dimension binary vector from R dimension binary vector to generate a return value for each of the one or more LSH functions.

13. The one or more servers as recited in claim 8, further comprising a Hash table creation unit configured to:

conduct one or more third Hash operations to an image signature of each of the one or more candidate images to obtain one or more third Hash values based on the one or more LSH functions; and conducting a fourth Hash operation to each of the one or more third Hash values to obtain one or more fourth Hash values; and recording each of the one or more fourth Hash values, a corresponding image identification, and a corresponding image signature in a corresponding Hash table.

14. One or more computer-readable media encoded with instructions that, when executed by a processor of a server, perform acts comprising:

receiving an image;

generating a multiple dimension vector indicating an image signature of the image based on edge histograms associated with the image;

conducting a first Hash operation to the image signature to generate a result of a first Hash value using a LSH function that is defined based on the multiple dimension vector;

conducting a second Hash operation to the result of the first Hash operation, thereby conducting the second Hash operation to the first Hash value using Message-Digest Algorithm to generate a second Hash value;

retrieving from a Hash table one or more candidate images based on the second Hash value; and determining a similarity between the image and each of the one or more candidate images using at least one of Hamming distance or Euclidean distance.

* * * * *